United States Patent
Cikoski

(10) Patent No.: US 11,099,834 B2
(45) Date of Patent: Aug. 24, 2021

(54) SOFTWARE BUILDS USING A CLOUD SYSTEM

(71) Applicant: HEWLETT-PACKARD DEVELOPMENT COMPANY, L.P., Spring, TX (US)

(72) Inventor: Max Junior Cikoski, Porto Alegre (BR)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/481,802

(22) PCT Filed: Nov. 16, 2017

(86) PCT No.: PCT/US2017/061944
§ 371 (c)(1),
(2) Date: Jul. 29, 2019

(87) PCT Pub. No.: WO2019/099008
PCT Pub. Date: May 23, 2019

(65) Prior Publication Data
US 2020/0272454 A1  Aug. 27, 2020

(51) Int. Cl.
*G06F 8/658* (2018.01)
*G06F 8/41* (2018.01)
*G06F 8/71* (2018.01)

(52) U.S. Cl.
CPC ............ *G06F 8/658* (2018.02); *G06F 8/48* (2013.01); *G06F 8/71* (2013.01)

(58) Field of Classification Search
CPC ... G06F 8/60; G06F 8/71; G06F 8/658; G06F 9/45533
See application file for complete search history.

(56) References Cited

U.S. PATENT DOCUMENTS

| | | | |
|---|---|---|---|
| 7,003,777 B2 | 2/2006 | Hines | |
| 7,266,805 B2 | 9/2007 | Weidman et al. | |
| 7,281,247 B2 | 10/2007 | Lodwick et al. | |
| 8,429,600 B2 | 4/2013 | Andrews et al. | |
| 9,250,893 B2 | 2/2016 | Blahaerath et al. | |
| 9,524,192 B2* | 12/2016 | van Velzen | G06F 8/70 |
| 10,805,154 B2* | 10/2020 | D'Onofrio | H04L 41/0609 |
| 2004/0068713 A1 | 4/2004 | Nicholas et al. | |

(Continued)

OTHER PUBLICATIONS

"Automated Image Builds with Jenkins, Packer and Kubernetes", Jan. 10, 2017.

*Primary Examiner* — Duy Khuong T Nguyen
(74) *Attorney, Agent, or Firm* — Brooks Cameron & Huebsch

(57) ABSTRACT

The examples include methods and apparatuses to build software using a cloud system. Building software can include receiving a number of events from a software repository reporting a change to the software repository and, based on receiving the number of events, trigger a software build. Building software can also include, based on triggering the software build, synchronizing the software repository on a cloud system to generate a synchronized software repository, instructing the cloud system to perform the software build using the synchronized software repository, and receiving and publishing an artifact generated by the software build.

18 Claims, 5 Drawing Sheets

(56) References Cited

U.S. PATENT DOCUMENTS

| | | | |
|---|---|---|---|
| 2007/0006041 A1* | 1/2007 | Brunswig | G06F 11/3688 |
| | | | 714/38.14 |
| 2009/0299920 A1* | 12/2009 | Ferris | G06Q 10/06 |
| | | | 705/418 |
| 2013/0074038 A1 | 3/2013 | Fox et al. | |
| 2013/0091099 A1 | 4/2013 | Novak et al. | |
| 2013/0152047 A1* | 6/2013 | Moorthi | G06F 11/368 |
| | | | 717/124 |
| 2013/0212562 A1 | 8/2013 | Fox et al. | |
| 2013/0346945 A1* | 12/2013 | Yousouf | G06F 8/60 |
| | | | 717/121 |
| 2014/0074849 A1 | 3/2014 | Zizka et al. | |
| 2017/0308359 A1* | 10/2017 | Singh | G06F 8/22 |
| 2017/0372247 A1* | 12/2017 | Tauber | G06F 11/3668 |
| 2020/0394654 A1* | 12/2020 | Concannon | H04L 63/00 |

\* cited by examiner

SOFTWARE BUILDS USING A CLOUD SYSTEM

BACKGROUND

Systems and devices can store data to protect against data loss. Stored data can be recovered and/or organize. A repository can be used to store files associated with software. A repository can be used to track software changes and/or versions of software.

DETAILED DESCRIPTION

Figure 1:
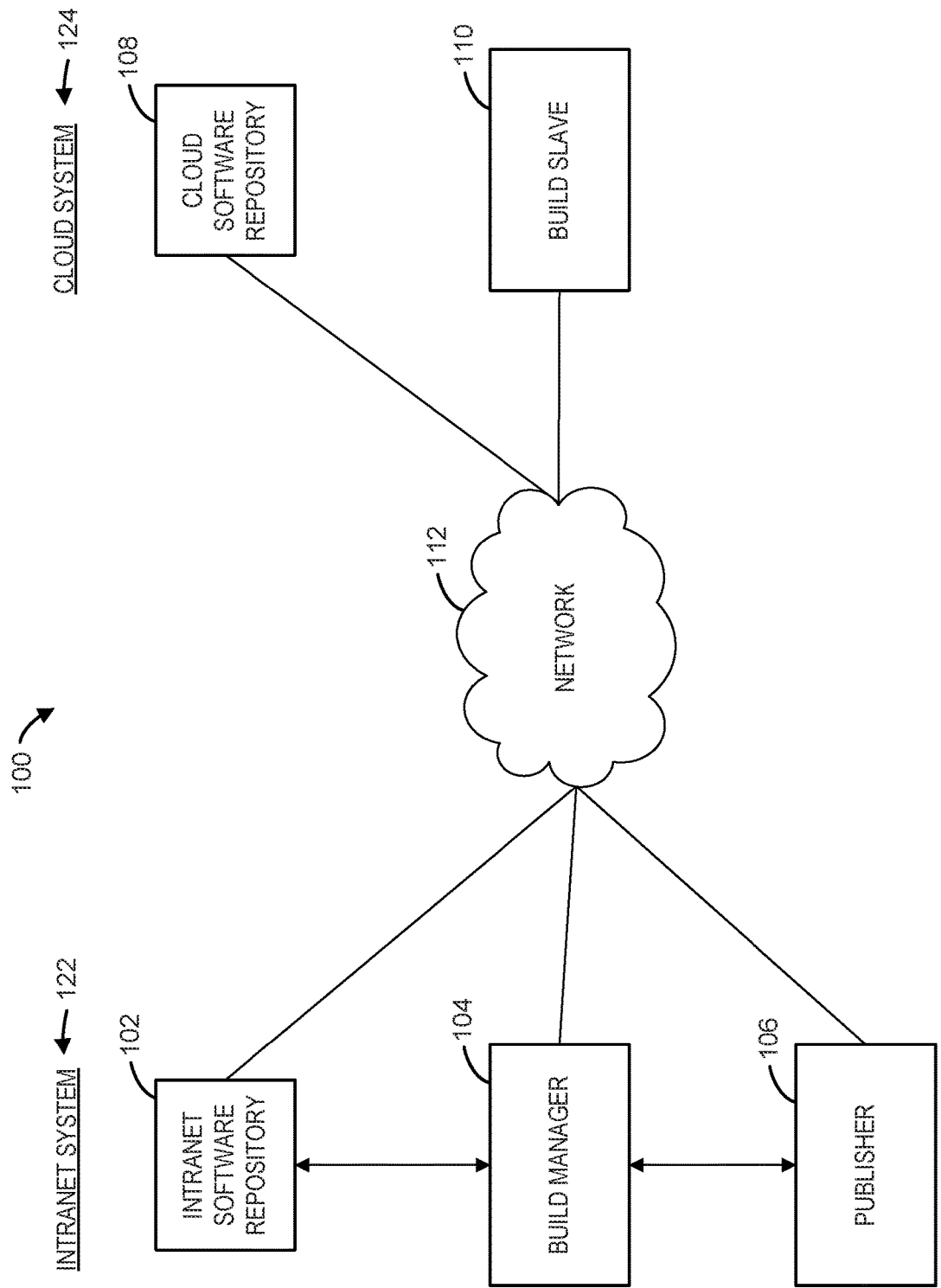
FIG. 1 illustrates an example of a system for generating software artifacts consistent with the disclosure.

A software repository can be hosted by premises enterprise servers and/or cloud-hosted servers. A software repository can be a data structure which stores metadata, files, and/or data structures. For example, a software repository can store source files associated with a computer application.

The software repository can store the changes to a number of files. For example, a software repository can store a history of changes to the files. The software repository can also can store software packages which may be retrieved and installed on a computing device.

A software repository can, for example, store a plurality of related files. For example, the software repository can store source files and corresponding executable files generated from the source files. The software repository can also store a history of changes to the source files and/or for the executable files. The software repository can also store software packages generated from the source files and/or the executable files.

As used herein, an artifact is an output generated by building software. For example, an artifact can be a collection of files (e.g., JAR files, WAR files, DLLS files, RPM files, etc.). The artifacts can include binary artifacts. The artifacts can also include packages. For example, the artifacts can include libraries and/or applications. In some examples, the artifacts can include metadata. The metadata can be associated with the collection of files and/or packages.

The artifacts can also include other types of files generated by building software. For example, the artifacts can be generated from files stored in a software repository. An artifact can also be referred to as a software artifact.

Events can be received from a software repository reporting a change to the software repository. Based on receiving the number of events, a software build can be triggered. Based on triggering the software build, the software repository can be synchronized on a cloud system to generate a synchronized software repository. The cloud system can be instructed to perform the software build using the synchronized software repository. The software build can generate an artifact. The artifact can be received and published as described herein. The examples described herein utilize a distributed environment to generate software artifacts from data stored in a repository.

In some approaches, adding a new build involves performing a plurality of operations which utilize testing and/or delivery time for generating new software components. The plurality of operations may be executed manually. For example, execution of the plurality of operations may be initiated manually. Manual execution of the plurality of operations can be error prone.

The examples described herein build software using transparent the machines over a distributed environment. The examples can include on premise enterprise servers and cloud hosted servers. The examples utilize a build process to provide savings in time and in effort used to build software as compared to some approaches. Upon identifying a change to a software repository, a build manager triggers a build to generate an artifact. The build can be performed automatically and autonomously.

The examples described herein simplify generating artifacts. The examples also reduce operator errors and a time used to generate artifacts.

The figures herein follow a numbering convention in which the first digit corresponds to the drawing figure number and the remaining digits identify an element or component in the drawing. For example, reference numeral 118 may refer to element "18" in FIG. 1 and an analogous element may be identified by reference numeral 218 in FIG. 2. Elements shown in the various figures herein can be added, exchanged, and/or eliminated to provide a number of additional examples. In addition, the proportion and the relative scale of the elements provided in the figures are intended to illustrate the examples described, and should not be taken in a limiting sense.

FIG. 1 illustrates an example of a system 100 for a cloud repository consistent with the disclosure. The system 100 includes an intranet system 122 and a cloud system 124.

The intranet system 122 includes an intranet software repository 102, a build manager 104, and a publisher 106. The cloud system 124 includes a cloud software repository 108 and a build slave 110. The system 100 also includes a network 112. The network 112 can include a physical network and/or a virtual network. The network 112 can couple the intranet system 122 to the cloud system 124.

The intranet system 122 can comprise a plurality of computing devices coupled through an intranet. The intranet system 122 can be part of an enterprise. The cloud system 124 can comprise a plurality of computing devices that are part of shared pooled resources. The plurality of computing devices can be provisioned to provide a plurality of services. For example, the cloud system 124 can provide software repository services. The cloud system 124 can also provide build services through, for example, the build slave 110.

The intranet software repository 102 can store a plurality of files that comprise data that can be associated with a programming language. For example, the intranet software repository 102 can store a plurality of source files associated with one or more programming language.

The intranet software repository 102 can also store a plurality of artifacts generated from the source files. The artifacts can include executable files and/or software packages generated from the source files.

The build manager 104 can manage a software build of the data stored in the intranet software repository 102. For example, the build manager 104 can trigger (e.g., initiate) a software build utilizing the data stored in the intranet software repository 102. The build manager 104 can also trigger a publishing of an artifact generated from the software build. The publisher 106 can publish the artifact provided by the build manager 104 and/or the build slave 110.

The intranet software repository 102, the build manager 104, and/or the publisher 106 can collectively or individual be referred to as an apparatus and/or a device. For example, each of the intranet software repository 102, the build manager 104, and the publisher 106 can comprise separate hardware and software components to host a software repository, a build manager, and the publisher, respectively. The intranet software repository 102, the build manager 104, and/or the publisher 106 can also be hosted on a same device and/or apparatus. For example, the intranet software repository 102 can be hosted on a first device, while the build manager 104 and the publisher 106 are hosted on a second device.

Each of the intranet software repository 102 and the publisher 106 can be coupled to the build manager 104 through the intranet system 122 utilizing a physical network and/or a virtual network. For example, the intranet software repository 102 can be coupled to the build manager 104 through a physical network that is part of the intranet system 122 while the build manager 104 is coupled to the publisher 106 through a virtual network that is part of the intranet system 122.

The build slave 110 can be coupled to the build manager 104 through the network 112. The build slave 110 can update the cloud software repository 108 and build an artifact utilizing one or more files provided by the build manager 104. The build slave 110 can also provide an artifact generate from the software build to the build manager 104.

The cloud software repository 108 and the build slave 110 can also comprise one or more apparatuses and/or devices. For example, the cloud software repository 108 can be hosted by a first device while the build slave 110 is hosted by a second device. The cloud software repository 108 can also be hosted by a same device that hosts the build slave 110.

Figure 2:
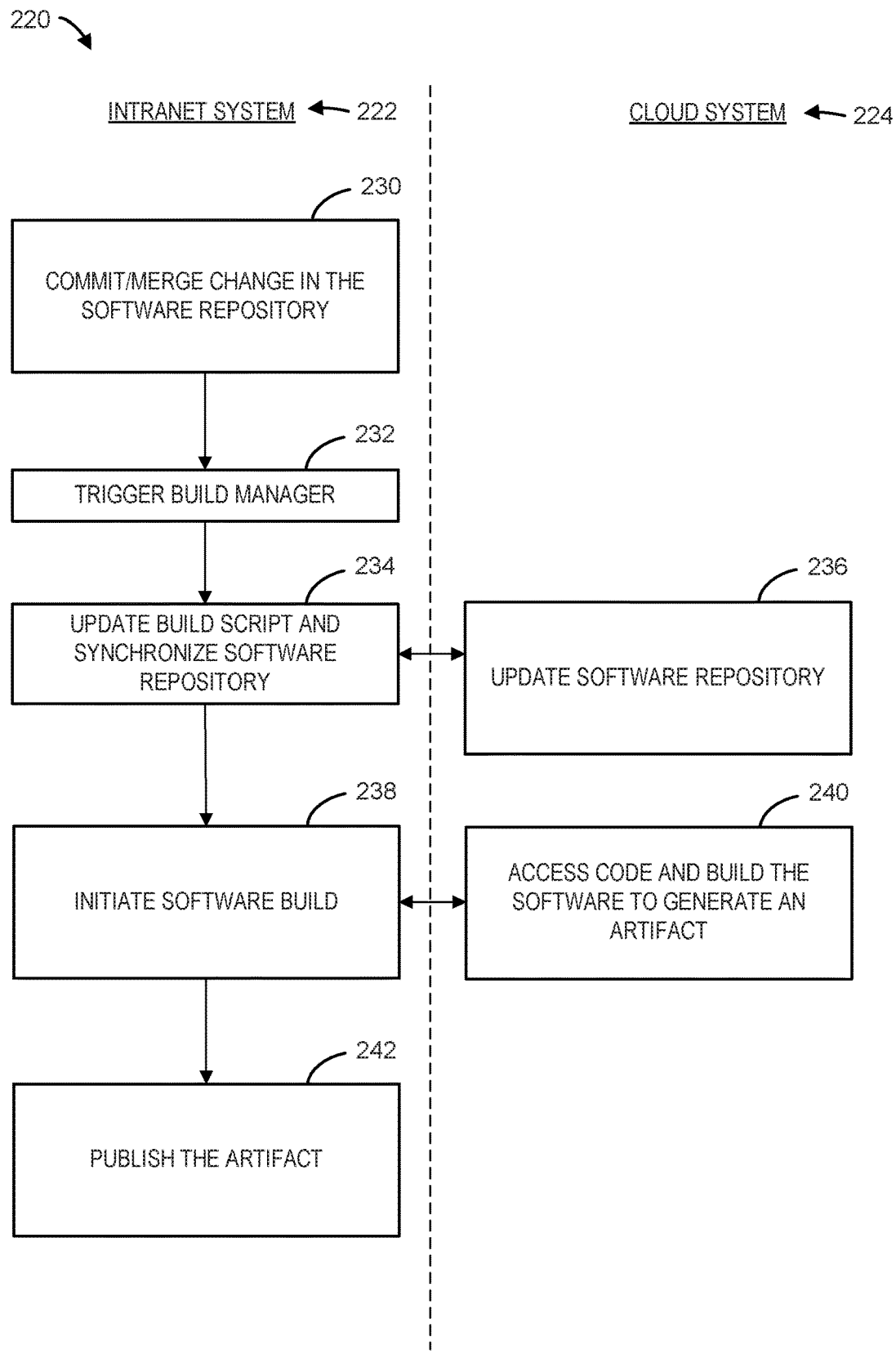
FIG. 2 illustrates an example of a workflow for building software using a cloud system consistent with the disclosure.

FIG. 2 illustrates an example of a workflow 220 for building software using a cloud system 224 consistent with the disclosure. The workflow 220 can be performed by a number of devices that are part of an intranet system 222 and/or a cloud system 224 which are analogous to the intranet system 122 and the cloud system 124 in FIG. 1.

At block 230, a change to the software repository can be committed and/or merged. For example, a file stored by the software repository (e.g., intranet software repository 102 in FIG. 1) can be checked out. The file can be altered. For example, source code contained in the file can be modified by deleting code and/or adding code. The file can then be checked in to the software repository. The software repository can determine that the file has been altered. The software repository can commit the changes or merge the changes to the file.

In some examples, a developer can push the changes to the software repository. The software repository can be an svn repository or a git repository, among other types of repositories. A software review tool (e.g. Gerrit) can also be used to review the code before the code is pushed to the software repository.

In some examples, files stored in the software repository can be deleted. The deletion of files stored in the software repository can be committed and/or merged. Files can be added to the software repository. The addition of the files to the software repository can also be committed and/or merged.

At block 232, the software repository can trigger the build manager (e.g., the build manager 104 in FIG. 1). For example, upon determining that a change to the software repository has been committed and/or merged, the software repository can provide an event to the build manager. The build manager can receive events from the software repository and/or a software review tool. The events provided to the build manager can trigger the build job to start in the build manager.

An event can be a message provided to the build manager. An event can include a push event or a pull event. In some examples, the event can include a push event and a pull event. A push event can describe that a change to a file is written to the software repository. A pull event can be a request to write the change, to a file, to the software repository. Receiving a push even and a pull event can include receiving the pull event before receiving the push event.

An event can include a patch event and/or a merge event. A software repository can generate a merge event when the software repository reconciles multiple changes made to versioned-controller files. For example, the software repository can merge two or more independent branches of a file. The software repository can generate a single collection of files containing the changes made to the files in two or more independent branches of the files. For example, the result of merging changes to a file made in two or more independent branches can include the generation of a single file containing the changes made in the two or more independent branches.

A software repository can generate a patch even when the software repository generates a file (e.g., patch file) that contains the changes made to a repository. The patch file can be applied to an older version of the file to update the file.

The build manager can process the event to determine whether to initiate a build job and/or what type of build job to initiate. For example, the build manager can initiate any of a plurality of different build jobs. A build job can also be references as a build. Each of the plurality of build jobs can be part of a software stack. A software stack can describe a plurality of processes and/or operations performed to generate an artifact. Each of the build stacks can be associated with a different one of a plurality of programming languages. For example, a first software stack can be used to generate a first artifact from source files written in a first programming language and a second software stack can be used to generate a second artifact from source files written in a second programming language. Each of the software stacks can be associated with a different intranet software repository, a different cloud software repository, a different build slave, and/or a different publisher.

In some examples, the build manager can identify a programming language associated with the software repository, data stored in the software repository, and/or the event. For example, the build manager can request and receive an identification of a programming language from the software repository. The build manager can also identify a programming language from the event. For example, the event can comprise an identification of the programming language. The identified programming language can be used to select a build job and a corresponding software stack.

At block 234, the build manager can update the build script and synchronize a software repository. Updating the build script can include updating a script used to perform the software build. For example, a script that controls the software stack can be updated based on a programming language. The script can coordinate the calls made to the build slave, the cloud repository, the publisher, and the intranet software repository. Synchronizing the software repository can include synchronizing the software repository (e.g., the software repository 102) and a cloud software repository (e.g., the cloud software repository 108). For example, the cloud software repository can be modified to reflect the software repository. The cloud software repository can be modified to mirror the software repository.

To synchronize the software repository, the build manager can provide a number of files stored in the software repository and a synchronization request to the build slave. In some examples, the build manager can provide the synchronization request to the build slave. The build slave can, based on the synchronization request, retrieve a number of files form the software repository.

At block 236, the build slave can update the software repository. The build slave can update the software repository by providing a first plurality of files to the cloud software repository and by instructing the cloud software repository to store the first plurality of files. The cloud software repository can store a second plurality of files that are generate from the first plurality of files. The second plurality of files can contain a same source code as the source code contained in the first plurality of files. The build slave can provide a "push-mirror" command to the cloud software repository (e.g., git repository). The build slave can provide a message to the build manager informing the build manager that the cloud software repository has been updated to mirror the software repository.

At block 238, the build manager initiates the software build. For example, the build manager can instruct the build slave to perform a build job. The build manager instructs the build slave to build an artifact from source files stored in the cloud software repository.

At block 240, the build slave can access code and build the software to generate an artifact. The build slave can access the source code from the cloud software repository by accessing a plurality of source files. The build slave can build an artifact from the source code utilizing a build routine. The build routine can be specific to a software stack. The build slave can provide the artifact to the build manager.

At block 242, the artifact is published. The build master can provide the artifact received from the build slave to the publisher. The publisher can publish the artifact received from the build manager. In some examples, the publisher can be part of the build manager such that the build manager publishes the artifact.

Publishing the artifact can include copying and/or deploying the artifact to different destinations. For example, the artifact can be stored to the software repository (e.g., the software repository 102 in FIG. 1) and/or a different destination. The artifact can be a compressed file and/or a versioned build artifact. The artifact can be an executable file. In some examples, publishing the artifact can include installing an executable file. Publishing the artifact can also include installing a patch on an application. The artifact can be published according to a selected software stack.

Upon publishing the artifact, the build manager can instruct the build slave to remove the source code from the cloud software repository and to remove the artifact generated by the build slave from the build slave. In some examples, the cloud software repository can be reset and the artifact can be removed from the build slave after the build slave provides the artifact to the build manager.

In some examples, generating a software stack can include updating a software repository to provide events to the build manager. Generating a software stack can also include defining a destination such as an artifact repository. Generating a software stack can also include defining a number or parameters associated with performing the build job. A new software stack can be defined when a software stack does not exist for a given programming language associated with an event or a software repository.

A build job can include providing an artifact a custom version number. For example, the cloud software repository, the software repository, the build manager, and/or the build slave can generate and assign a customer version number to an artifact generated by the build slave.

Figure 3:
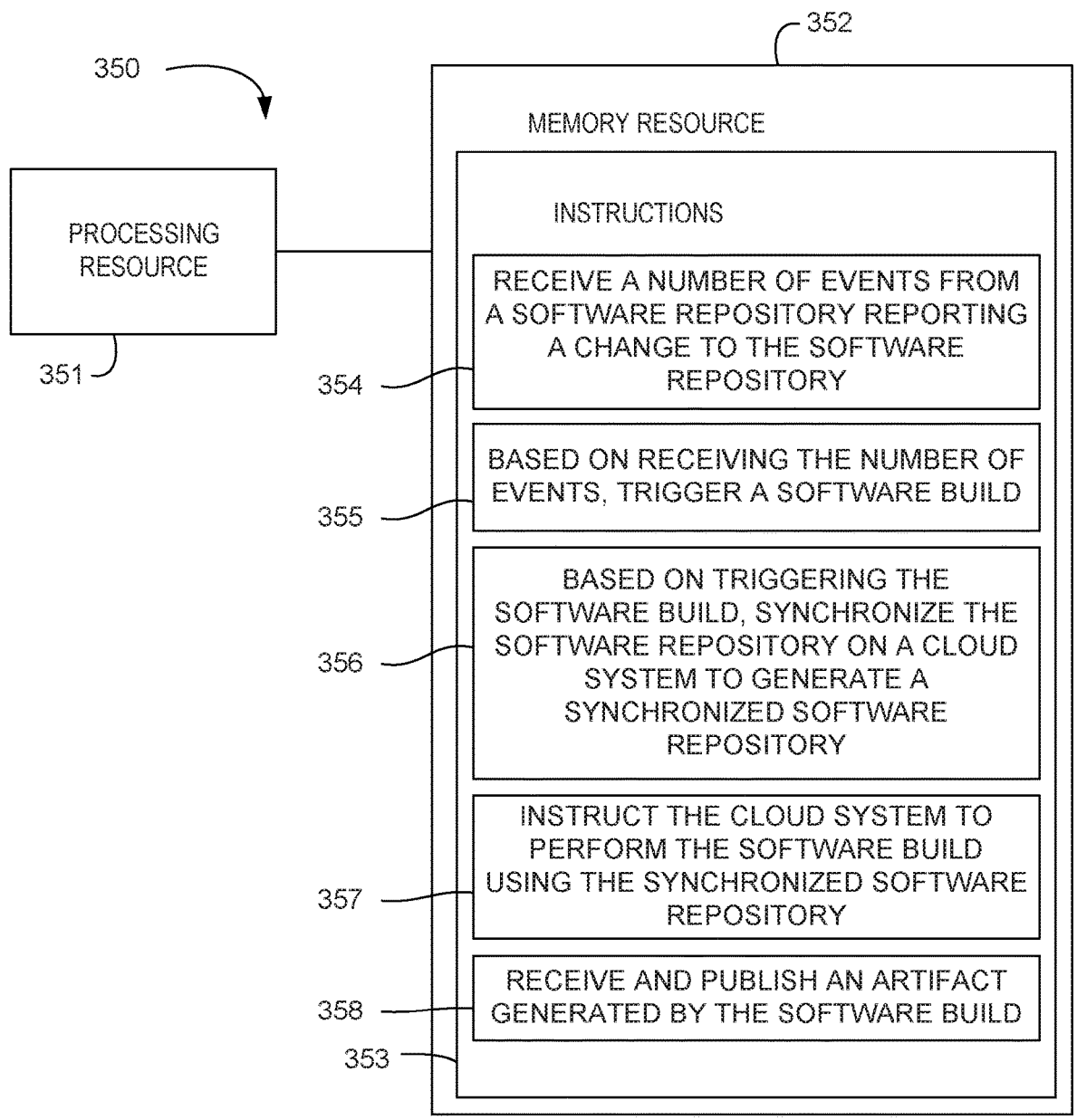
FIG. 3 illustrates an example of an apparatus consistent with the disclosure.

FIG. 3 illustrates an example of an apparatus 350 consistent with the disclosure. As shown in FIG. 3, the apparatus 350 includes a processing resource 351 and a memory resource 352.

The processing resource 351 may be a hardware processing unit such as a microprocessor, application specific instruction set processor, coprocessor, network processor, or similar hardware circuitry that can cause machine-readable instructions to be executed. In some examples, the processing resource 351 may be a plurality of hardware processing units that can cause machine-readable instructions to be executed. The processing resource 351 can include central processing units (CPUs) and/or graphics processing units (CPUs), among other types of processing units. The memory resource 352 may be any type of volatile or non-volatile memory or storage, such as random access memory (RAM), flash memory, read-only memory (ROM), storage volumes, a hard disk, or a combination thereof.

The memory resource 352 may store instructions 353 thereon. When executed by the processing resource 351, the instructions 353 may cause the apparatus 350 to perform specific tasks and/or functions. For example, at block 354, the memory resource 352 may store instructions 353 which may be executed by the processing resource 351 to cause the apparatus 350 to receive a number of events from a software repository reporting a change to the software repository. At block 355, the memory resource 352 may store instructions 353 which may be executed by the processing resource 351 to cause the apparatus 350 to, based on receiving the number of events, trigger a software build. At block 356, the memory resource 352 may store instructions 353 which may be executed by the processing resource 351 to cause the apparatus 350 to, based on triggering the software build, synchronize the software repository on a cloud system to generate a synchronized software repository.

At block 357, the memory resource 352 may store instructions 353 which may be executed by the processing resource 351 to cause the apparatus 350 to instruct the cloud system to perform the software build using the synchronized software repository. At block 358, the memory resource 352 may store instructions 353 which may be executed by the processing resource 351 to cause the apparatus 350 to receive and publish an artifact generated by the software build.

The instructions 353 executed by the processing resource 351 to receive the number of events are further executed to receive a push event and/or a pull event. The push event can describe that the change to a file is written to the software repository. The pull event can be a request to write the change, to a file, to the software repository. In some examples, the push event can be received before the pull event is received.

The instructions 353 executed by the processing resource 351 to receive the number of events are further executed to receive a patch event. The instructions 353 can also be executed to receive a merge event.

Figure 4:
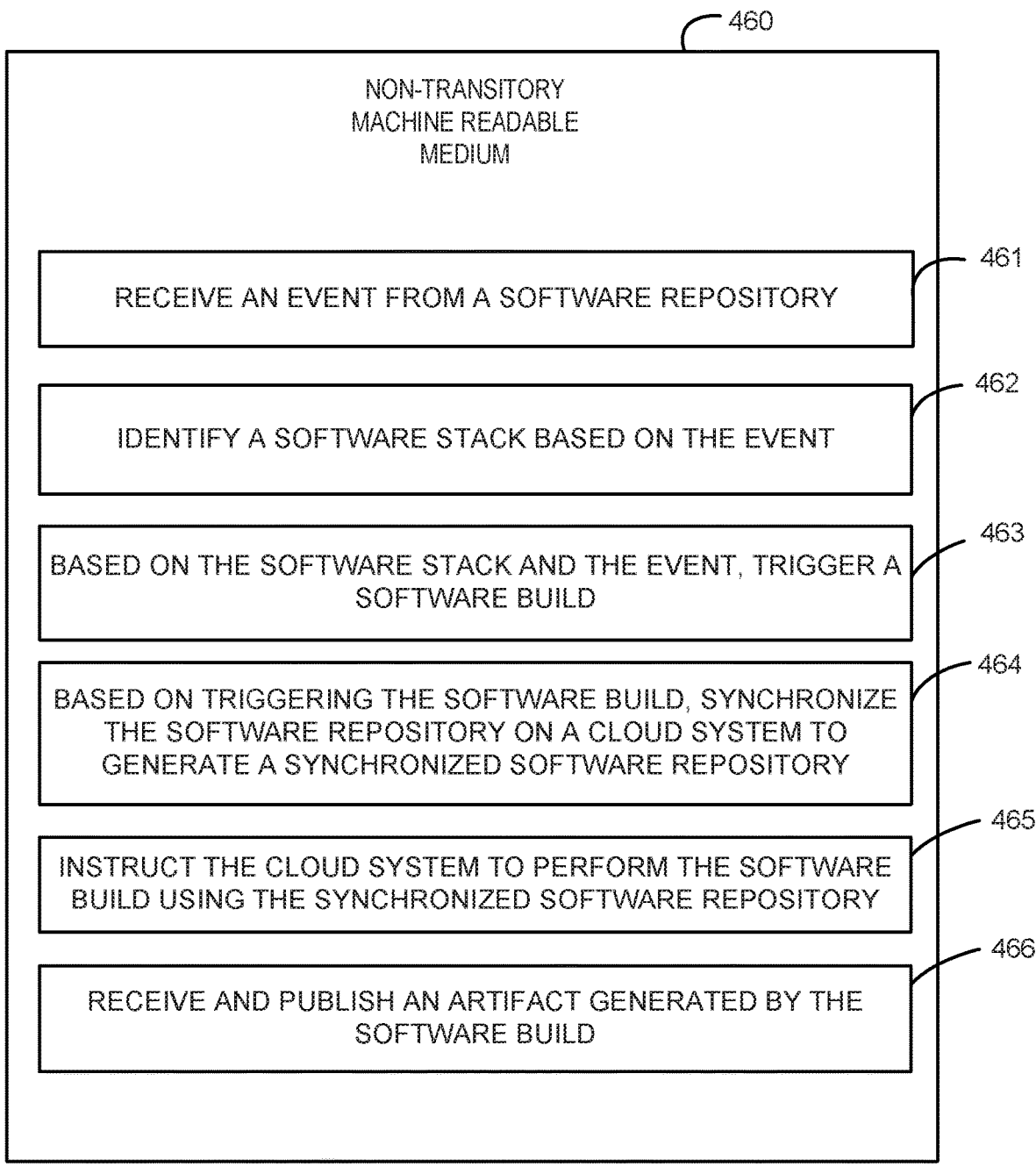
FIG. 4 illustrates an example non-transitory machine-readable medium consistent with the disclosure.

FIG. 4 illustrates an example non-transitory machine-readable medium 460 consistent with the disclosure. A processing resource may execute instructions stored on the non-transitory machine readable medium 460. The non-transitory machine readable medium 460 may be any type of volatile or non-volatile memory or storage, such as random access memory (RAM), flash memory, read-only memory (ROM), storage volumes, a hard disk, or a combination thereof.

The example medium 460 stores instructions 461 executable by a processing resource to receive an event from a software repository. The example medium 460 stores instructions 462 executable by a processing resource to identify a software stack based on the event.

The example medium 460 stores instructions 463 executable by the processing resource to, based on the software stack and the event, trigger a software build. The example medium 460 stores instructions 464 executable by the processing resource to, based on triggering the software build, synchronize the software repository on a cloud system to generate a synchronized software repository. The example medium 460 stores instructions 465 executable by the processing resource to instruct the cloud system to perform the software build using the synchronized software repository. The example medium 460 stores instructions 466 executable by the processing resource to receive and publish an artifact generated by the software build.

The instructions 462 to identify the software stack further comprise instructions to identify a programming language associated with the software repository. The programming language can be identified from the event. The programming language can also be identified from the software repository. The example medium 460 can also include instructions to trigger the software build, from a plurality of software builds, based on the programming language.

Figure 5:
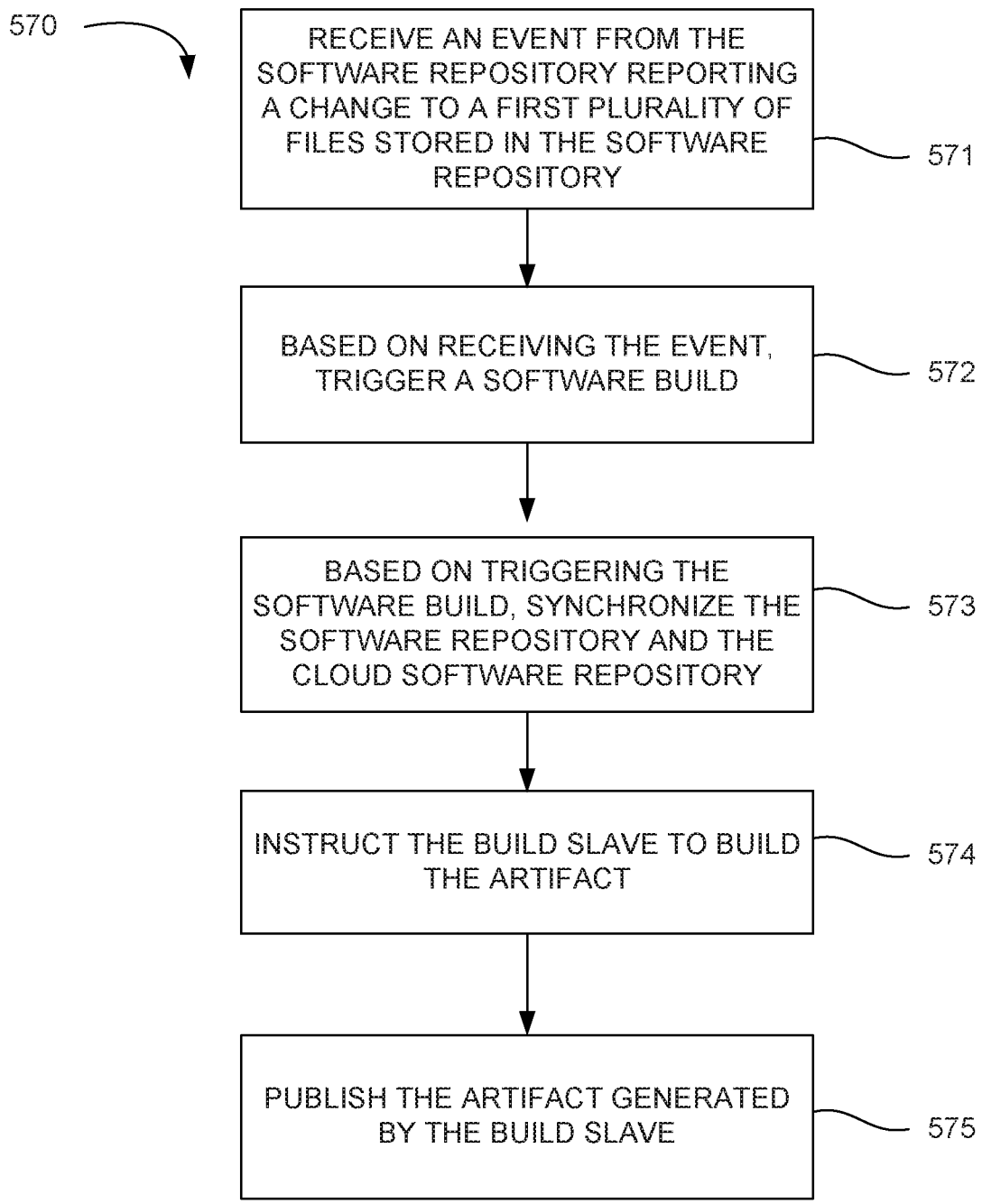
FIG. 5 illustrates an example flow diagram of a method consistent with the disclosure.

FIG. 5 illustrates an example flow diagram of a method 570 consistent with the disclosure. At block 571, the method 570 includes receiving an event from the software repository reporting a change to a first plurality of files stored in the software repository. At block 572, the method 570 includes, based on receiving the event, triggering a software build. At block 573, the method 570 includes, based on triggering the software build, synchronizing the software repository and the cloud software repository. At block 574, the method 570 includes instructing the build slave to build the artifact. At block 575, the method 570 includes publishing the artifact generated by the build slave.

The method 570 can further include publishing the artifact to the software repository. The artifact can also be published to a package manager.

The software repository and the cloud software repository can be synchronized by synchronizing the first plurality of files and the second plurality of files. The first plurality of files and the second plurality of files can be synchronized by providing the first plurality of files to the build slave. The build slave can generate the second plurality of files based on the first plurality of files.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. As used herein, designators such as "N", etc., particularly with respect to reference numerals in the drawings, indicate that a number of the particular feature so designated can be included. A "plurality of" is intended to refer to more than one of such things.

What is claimed:

1. An apparatus comprising:
    a memory;
    a processor executing instructions stored in the memory to:
        receive a number of events from an intranet software repository reporting a change to the intranet software repository;
        identify a programming language associated with the intranet software repository or the number of events;
        trigger, via an intranet build manager, a software build based on the received number of events and the identified programming language;
        based on triggering the software build, instruct a cloud system to synchronize the intranet software repository with a cloud software repository on the cloud system to generate a synchronized cloud software repository;
        instruct the cloud system to perform the software build using the synchronized cloud software repository; and
        receive and publish, via an intranet publisher, an artifact generated by the software build using the synchronized cloud software repository.

2. The apparatus of claim 1, wherein the processor to receive the number of events is further to receive a push event.

3. The apparatus of claim 2, wherein the push event describes that the change to a file is written to the software repository.

4. The apparatus of claim 1, wherein the processor to receive the number of events is further to receive a pull event.

5. The apparatus of claim 4, wherein the pull event is a request to write the change to a file to the software repository.

6. The apparatus of claim 1, wherein the processor to receive the number of events is further to receive a push event and a pull event.

7. The apparatus of claim 6, wherein the processor to receive the push event and the pull event is further to receive the pull event before receiving the push event.

8. The apparatus of claim 1, wherein the processor to receive the number of events is further to receive a patch event.

9. The apparatus of claim 1, wherein the processor to receive the number of events is further to receive a merge event.

10. A non-transitory machine-readable medium storing instructions executable by a processing resource to:
    receive an event from an intranet software repository;
    identify a software stack based on the event;
    identify a programming language from the intranet software repository or from the event;
    trigger a software build, from a plurality of software builds, based on the received event and the identified programming language;
    based on triggering the software build, synchronize the intranet software repository with a cloud software repository on a cloud system to generate a synchronized cloud software repository;
    instruct the cloud system to perform the software build using the synchronized cloud software repository; and receive and publish, via an intranet publisher, an artifact generated by the software build.

11. The non-transitory machine-readable medium of claim 10, further comprising instructions to identify the programming language from the event.

12. The non-transitory machine-readable medium of claim 10, further comprising instructions to identify the programming language from the intranet software repository.

13. A system to generate a software artifact, comprising:
an intranet software repository;
a cloud system including a plurality of computing devices that are part of shared pooled resources which are provisioned to provide services including providing a cloud software repository;
a cloud build slave to build an artifact using a second plurality of files stored in the cloud software repository; and
an intranet build manager to:
receive an event from the intranet software repository reporting a change to a first plurality of files stored in the intranet software repository;
identify a programming language from the intranet software repository or from a number of events;
trigger a software build from a plurality of software builds based on the received event and the identified programming language;
based on triggering the software build, synchronize the intranet software repository and the cloud software repository;
instruct the cloud build slave to build the artifact;
receive the artifact from the cloud build slave; and
instruct an intranet publisher to publish the artifact generated by the cloud build slave.

14. The system of claim 13, wherein the intranet build manager to instruct the intranet publisher to publish the artifact is further to instruct the intranet publisher to publish the artifact to the intranet software repository.

15. The system of claim 13, wherein the intranet build manager to instruct the intranet publish to publish the artifact is further to publish the artifact to a package manager.

16. The system of claim 13, wherein the build manager to synchronize the intranet software repository and the cloud software repository is further to synchronize the first plurality of files and the second plurality of files.

17. The system of claim 16, wherein the build manager to synchronize the first plurality of files and the second plurality of files is further to provide the first plurality of files to the cloud build slave.

18. The system of claim 17, wherein the cloud build slave is further to generate the second plurality of files based on the first plurality of files.

* * * * *